(12) United States Patent
Papenfuhs

(10) Patent No.: US 6,635,708 B1
(45) Date of Patent: Oct. 21, 2003

(54) AQUEOUS PLASTIC DISPERSIONS PRESENTING INCREASED STABILITY

(75) Inventor: Bernd Papenfuhs, Obertshausen (DE)

(73) Assignee: Clariant GmbH (DE)

( * ) Notice: Subject to any disclaimer, the term of this patent is extended or adjusted under 35 U.S.C. 154(b) by 0 days.

(21) Appl. No.: 09/959,086

(22) PCT Filed: Apr. 13, 2000

(86) PCT No.: PCT/EP00/03628

§ 371 (c)(1),
(2), (4) Date: Oct. 16, 2001

(87) PCT Pub. No.: WO00/63258

PCT Pub. Date: Oct. 26, 2000

(30) Foreign Application Priority Data

Apr. 16, 1999 (DE) .......................... 199 17 285

(51) Int. Cl.⁷ .......................... C08L 31/02; C08F 22/02; C08F 220/04
(52) U.S. Cl. .................. 524/832; 524/561; 524/562; 524/250; 525/327.6
(58) Field of Search .......................... 523/121; 524/550, 524/555, 561, 562, 250, 832; 525/327.6

(56) References Cited

U.S. PATENT DOCUMENTS

| | | | | |
|---|---|---|---|---|
| 5,959,024 A | * | 9/1999 | Farwaha et al. ............ | 524/716 |
| 6,258,890 B1 | * | 7/2001 | Schmidt-Thuemmes et al. ......... | 524/555 |
| 6,291,422 B1 | * | 9/2001 | Turowski-Wanke et al. ................ | 510/535 |

FOREIGN PATENT DOCUMENTS

| | | |
|---|---|---|
| DE | 1 959 509 | 5/1971 |
| DE | 35 38 451 | 5/1987 |
| WO | WO 93/03004 | 2/1993 |

OTHER PUBLICATIONS

English abstract for DE1956509, May 19, 1971.
English abstract for DE 3538451, May 7, 1987.

* cited by examiner

*Primary Examiner*—Tae H. Yoon
(74) *Attorney, Agent, or Firm*—Muserlian, Lucas and Mercanti

(57) ABSTRACT

The invention relates to aqueous plastic dispersions containing latex particles which present anionic groups and are characterized in that at least some of the anionic groups comprise aminated sugar alcohols in protonated form as counterions. The invention also relates to methods for producing same and to their use.

4 Claims, No Drawings

AQUEOUS PLASTIC DISPERSIONS PRESENTING INCREASED STABILITY

The present invention relates to aqueous polymer dispersions which have been stabilized electrostatically by means of anionic groups and which may be obtained, for example, by emulsion polymerization, to processes for preparing them, and to their use.

It is known that, thermodynamically, latices constitute unstable systems which must be stabilized as effectively as possible by means of appropriate measures. One possibility for stabilizing with respect to formation of gel specks or coagulation induced by shearing load, addition of electrolyte or a particularly high solids content may be achieved by copolymerizing monomers containing acidic groups. In general, inorganic bases, such as alkali metal hydroxides or ammonia, are used for neutralizing these acidic groups. From DE-A-19 56 509, dispersions are also known which have been neutralized with specific alkanolamines (namely monohydroxyalkyl-substituted ammonia derivatives) as counterions.

Surprisingly it has now been found that neutralization of acidic groups present on the latex particle surface with aminated sugar alcohols leads to polymer dispersions which are significantly more stable than the prior art.

The present application accordingly provides aqueous polymer dispersions comprising latex particles which contain anionic groups, which are characterized in that at least some of the anionic groups have aminated sugar alcohols in protonated form as counterion.

Preferred aminated sugar alcohols used are N-alkylglucamines or D-glucamine, with particular preference N-alkylglucamines in which the alkyl group has from 1 to 4 carbon atoms, and especially N-methylglucamine. Furthermore, it is also possible to use diglucamines.

The neutralization of an acidic polymer dispersion, which is intended to bring about full charge dissociation and hence stabilization, is normally a critical process step, owing to the high local ion concentration that occurs, and is a step during which a greater or lesser number of gel specks are formed or even, in the worst case, complete coagulation occurs.

If, in contrast, aminated sugar alcohols, preferably N-alkylglucamine, especially N-methylglucamine (NMG), or at least a portion of this aminated sugar alcohol, are or is used as base for the partial or complete neutralization of the polymer dispersions, then a distinct stability advantage is evident in comparison with the products obtained with the neutralizing agents that have been customary to date: the determination of the coagulum content of a latex neutralized with different bases, by filtration, in fact always gives the lowest sieve residue figures for products treated with aminated sugar alcohols, irrespective of the monomer system used for the polymerization.

A further advantage is the renewable raw material basis of these compounds, which are obtainable directly from the corresponding carbohydrates by reductive amination.

The aminated sugar alcohols in question, obtainable starting from glucose, which are described, for example, in WO 93/03004, and which are normally used industrially as raw materials for surfactants (DE-A-35 38 451), are readily soluble in water and are also commercially available in this form.

The advantages of the polymer dispersions of the invention lie in the significantly increased stability as compared with the conventional products, which has positive consequences in connection with the processing of the dispersions to end products, such as inks, plasters, paints or adhesives.

Thus the formation of coagulum or gel specks which is frequently observed on the subsequent addition of pigments, electrolytes, thickeners, etc., and shearing loads occurring in parallel, is greatly restricted or does not occur at all. This advantage, moreover, has no adverse effects whatsoever on the performance properties of the products.

The dispersions of the invention are preferably prepared simply by stirring an aqueous solution (from 5 to 70% in strength) of the aminated sugar alcohol in question into the latex—which is acidic or has already been partly neutralized with other bases. The temperature here is generally between 0° C. and 100° C., preferably between 20° C. and 80° C. Also possible, of course, is the stirred introduction of the latex—which is acidic or has already been partially neutralized with other bases—into the aqueous solution of the aminated sugar alcohol in question.

The monomer system on which the polymer dispersion is based, and monomer ratio, is of minor importance, as is the nature of the preceding process for preparing the latex (reemulsification of dispersion powder, emulsion polymerization, suspension polymerization, etc.).

The aqueous polymer dispersions of the invention find application preferably in inks, plasters, paints, and adhesives.

The present invention is described in more detail below, with reference to implementation examples, though without being restricted thereby.

EXAMPLES AND COMPARATIVE EXAMPLES

Determination of the Sieve Residue

The so-called sieve residue is determined as a measure of the different stability of the latices as a function of the counterions, following neutralization of model dispersions with the different bases. This determination is made directly following the pH adjustment, after a 14-day storage period in a drying oven at 50° C., and after 2 minutes of severe shear loading of the samples immediately following neutralization.

The sieve residue corresponds to the fraction of coarse specks and coagulum in polymer dispersions and is determined as follows:

100.0 g of the homogenized dispersion sample for investigation are diluted carefully with 500.0 g of distilled water, without forming a foam. The mixture is then poured through a pre-tared sieve, consisting of an appropriately clamped-in section of degreased steel wire mesh (stainless steel fine wire mesh No. 375VA140K, "Multi" type, Art. No. 00100540-15, manufacturer: Haver & Boecker, 47400 Oelde/Westphalia) with a mesh size of 0.04 mm, and the residue is carefully "rinsed" with the distilled water used to rinse out the sample vessel (quantiative transfer) until free of foam. The wet sieve is then placed on a clean Petri dish and dried at from 105° C. to 135° C. for at least one hour. Finally, the cooled sieve is weighed again and, using the initial mass, the sieve residue is calculated, in % by weight. The figures given in the tables correspond to the mean of a duplicate determination carried out in this way.

Determination of the Shear Stability

In order to determine the shear stability, 150 ml of the respective dispersion sample are sheared at 5000 revolutions per minute in a Cowles dissolver with dispersing disk (diameter: 5 cm) and metal cup (diameter: 8.5 cm, volume: approximately 800 ml) for 120 seconds.

If there is coagulation of the latex (extreme increase in viscosity), the shearing is immediately stopped and the time elapsed is stated. If no coagulation of the dispersion occurs during the shear loading, the dispersion is transferred to a 500 ml glass bottle with screw closure and, after the foam has subsided, the sieve residue is determined as described above.

The model dispersions chosen were two products from Clariant GmbH: ®Mowilith LDM 7250 approximately 50% is a plasticizer-free aqueous dispersion based on acrylic and methacrylic esters, which is used as a laminating adhesive for high-gloss film lamination, for example.

®Mowilith VDM 7830 approximately 50% is likewise a plasticizer-free aqueous dispersion which is based on acrylic esters and styrene as principal monomers and is used to impregnate decorating foils and finishing foils or vertical edges in the furniture industry.

Both latices include acrylic acid and methacrylic acid as stabilizing comonomers, which following the polymerization are neutralized normally using sodium hydroxide solution (®Mowilith LDM 7250) or aqueous ammonia (®Mowilith VDM 7830). In addition to these two bases, the compounds reproduced in the tables—monoethanolamine, diethanolamine, and the inventive N-methylglucamine—are used in the tests. In order to establish a pH of approximately 6.5, all of the neutralizing agents are added dropwise to the dispersion samples to be tested, with slow stirring at 30° C., in the form of 10% strength aqueous solutions. Finally, the solids content is set to a uniform level of approximately 48% by adding distilled water.

EXAMPLE 1

®Mowilith LDM 7250

| | | | a) after preparation | | |
|---|---|---|---|---|---|
| Neutr. agent | NaOH | $NH_3$ | $H_2N$ $(CH_2CH_2OH)$ | $HN(CH_2CH_2OH)_2$ | $HN$ $(CH_3)R^{*)}$ |
| Solids content | 48.2% | 48.1% | 47.8% | 48.3% | 48.0% |
| pH | 6.5 | 6.7 | 6.4 | 6.7 | 6.3 |
| Sieve residue | 0.002% | 0.002% | 0.002% | 0.001% | <0.001% |

*)R = 2,3,4,5,6-pentahydroxyhexyl radical

| | | | b) after storage | | |
|---|---|---|---|---|---|
| Neutr. agent | NaOH | $NH_3$ | $H_2N$ $(CH_2CH_2OH)$ | $HN$ $(CH_2CH_2OH)_2$ | $HN$ $(CH_3)R^{*)}$ |
| Sieve residue | 0.002% | 0.005% | 0.003% | 0.004% | <0.001% |

| | | | c) after shear loading | | |
|---|---|---|---|---|---|
| Neutr. Agent | NaOH | $NH_3$ | $H_2N$ $(CH_2CH_2OH)$ | $HN$ $(CH_2CH_2OH)_2$ | $HN$ $(CH_3)R^{*)}$ |
| sieve residue | 0.004% | 0.006% | 0.004% | 0.004% | 0.001% |

EXAMPLE 2

®Mowilith VDM 7830

| | | | a) after preparation | | |
|---|---|---|---|---|---|
| Neutr. agent | NaOH | $NH_3$ | $H_2N$ $(CH_2CH_2OH)$ | $HN$ $(CH_2CH_2OH)_2$ | $HN$ $(CH_3)R^{*)}$ |
| Solids content | 48.3% | 48.0% | 47.8% | 48.1% | 48.1% |
| pH | 6.3 | 6.6 | 6.5 | 6.6 | 6.4 |
| Sieve residue | 0.004% | 0.004% | 0.003% | 0.003% | 0.001% |

*)R = 2,3,4,5,6-pentahydroxyhexyl radical

| | | | b) after storage | | |
|---|---|---|---|---|---|
| Neutr. agent | NaOH | $NH_3$ | $H_2N$ $(CH_2CH_2OH)$ | $HN$ $(CH_2CH_2OH)_2$ | $HN$ $(CH_3)R^{*)}$ |
| Sieve residue | 0.005% | 0.007% | 0.004% | 0.005% | 0.001% |

| | | | c) after shear loading | | |
|---|---|---|---|---|---|
| Neutr. agent | NaOH | $NH_3$ | $H_2N$ $(CH_2CH_2OH)$ | $HN$ $(CH_2CH_2OH)_2$ | $HN$ $(CH_3)R^{*)}$ |
| Sieve residue | 0.007% | 0.008% | 0.005% | 0.006% | 0.001% |

What is claimed is:

1. Aqueous polymer dispersions comprising latex particles having a surface, wherein the surface contains an amionic group wherein at least one of the anionic groups are neutralized by counterions of N-alkylglucamine or D-glucamine.

2. An ink, plastic, paint or adhesive composition of increased stability, the improvement comprising using therein an aqueous dispersion of claim 1.

3. Aqueous polymer dispersions comprising latex particles which contain anionic groups, characterized in that at least some of the anionic groups have aminated sugar alcohols in protonated form as counterions, and wherein the aminated sugar alcohols are N-methylglucamine.

4. A process for preparing aqueous polymer dispersions having latex particles which contain anionic groups, wherein at least some of the anionic groups have aminated sugar alcohols in protonated form as counterions comprising the step of stirring into the latex, acidic or partly neutralized with other bases, an aqueous solution of the aminated sugar alcohol.

* * * * *